United States Patent
Khanna

(10) Patent No.: US 10,839,260 B1
(45) Date of Patent: Nov. 17, 2020

(54) CONSISTENT DISTRIBUTED EDGE MODELS VIA CONTROLLED DROPOUT MODEL TRAINING

(71) Applicant: Amazon Technologies, Inc., Seattle, WA (US)

(72) Inventor: Aran Khanna, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 149 days.

(21) Appl. No.: 15/819,937

(22) Filed: Nov. 21, 2017

(51) Int. Cl.
- *G06N 3/04* (2006.01)
- *G06N 3/08* (2006.01)
- *G06K 9/62* (2006.01)
- *G06T 7/73* (2017.01)
- *G06K 9/20* (2006.01)
- *G06K 9/78* (2006.01)

(52) U.S. Cl.
CPC ........... *G06K 9/6256* (2013.01); *G06K 9/209* (2013.01); *G06K 9/78* (2013.01); *G06N 3/04* (2013.01); *G06N 3/0445* (2013.01); *G06N 3/08* (2013.01); *G06T 7/75* (2017.01); *G06T 2207/30232* (2013.01)

(58) Field of Classification Search
CPC ................................. G06N 3/02; G06N 20/00
See application file for complete search history.

(56) References Cited

U.S. PATENT DOCUMENTS

| | | | |
|---|---|---|---|
| 2015/0177030 A1* | 6/2015 | Vilim | G01D 3/08 702/183 |
| 2016/0071004 A1* | 3/2016 | Salahshoor | G05B 23/0283 706/2 |
| 2016/0328646 A1* | 11/2016 | Lin | G06N 3/08 |
| 2018/0253629 A1* | 9/2018 | Bamba | G06K 9/2054 |

OTHER PUBLICATIONS

Williem, "A Suspicious Behaviour Detection Using a Context Space Model for Smart Surveillance Systems." Computer Vision and Image Understanding 112 (2012), pp. 194-209 (Year: 2012).*
Kim et al., "Distributed Tracking in a Large-Scale Network of Smart Cameras." ICDSC 2010 Proceedings of the Fourth ACM/IEEE International Conference on Distributed Smart Cameras. pp. 8-16. (Year: 2010).*

* cited by examiner

*Primary Examiner* — Brian T Pendleton
*Assistant Examiner* — Kyle M Lotfi
(74) *Attorney, Agent, or Firm* — Nicholson De Vos Webster & Elliott, LLP

(57) ABSTRACT

Consistent distributed edge models via controlled dropout model training are described. According to some embodiments, a machine learning model is trained using multiple sensor data streams. During the training process, ones of the sensor data streams are dropped to cause the model to be generated to be robust in that it can tolerate missing input data from sensor data sources yet still maintain high accuracy. The model can be deployed to multiple sensor devices within an environment. The sensor devices generate sensor data and exchange a variety of types of data to ultimately (Continued)

result in a distributed, consistent model result being generated that remains accurate despite communication faults that may occur between ones of the sensor devices.

20 Claims, 9 Drawing Sheets

CONSISTENT DISTRIBUTED EDGE MODELS VIA CONTROLLED DROPOUT MODEL TRAINING

BACKGROUND

The field of machine learning has become widely acknowledged as a likely significant driver of the future of technology. Organizations everywhere now seek to use machine learning techniques to address a wide variety of problems, such as optimizing aspects of their products, processes, customer experience, etc. While the high-level view of machine learning sounds simple—e.g., provide training data to a computer, to allow the computer to automatically learn from the training data to generate a model that can make predictions for other data—implementing machine learning techniques in practice can be tremendously difficult.

This difficulty is partially due to the underlying algorithmic and mathematical complexities of machine learning algorithms, which are typically developed by academic researchers or individuals at the forefront of the field. Additionally, it is also difficult to generate, update, and deploy useful models, which can be extremely time and resource consumptive and filled with complexities. Moreover, machine learning models tend to be extremely focused on particular use cases and operating environments, and thus any change to the underlying environment or use case may require a complete regeneration of a new model. Further, constructing and deploying machine learning technologies is quite different from traditional software engineering, and requires practices and architectures different from what traditional software engineering development teams are familiar with.

BRIEF DESCRIPTION OF DRAWINGS

Various embodiments in accordance with the present disclosure will be described with reference to the drawings, in which.

DETAILED DESCRIPTION

Figure 1:
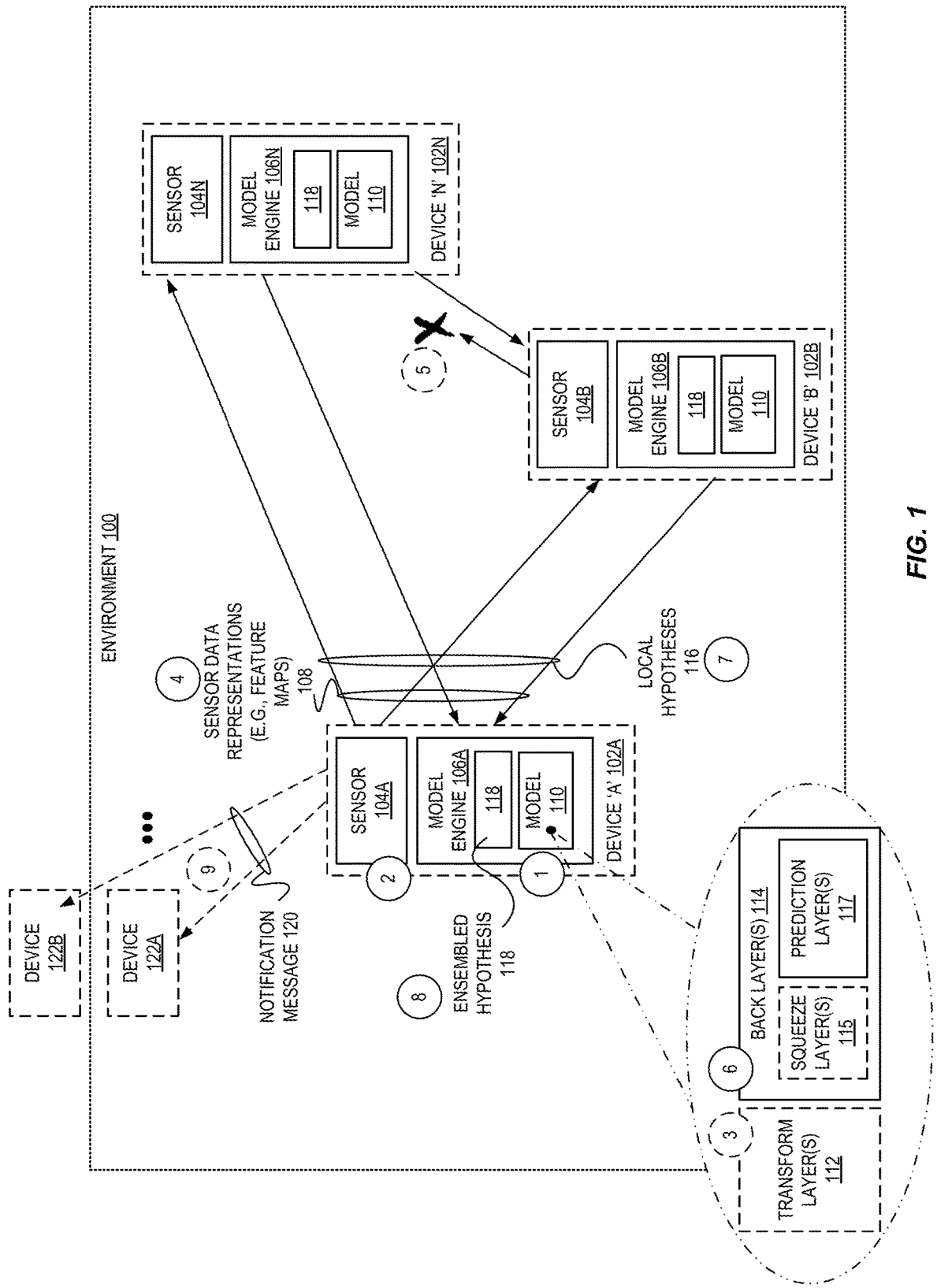
FIG. 1 is a block diagram illustrating an environment utilizing consistent distributed edge models resulting from controlled dropout model training according to some embodiments.

Various embodiments of methods, apparatus, systems, and non-transitory computer-readable storage media for consistent distributed edge models via controlled dropout model training are described. According to some embodiments, a machine learning model is trained using multiple sensor data streams. During the training process, a subset of each of the sensor data streams are "dropped" to cause the model to be generated in a robust manner such that it can tolerate missing input data from sensor data sources while still maintaining high accuracy.

In some embodiments, machine learning models resulting from such controlled dropout model training are deployed to multiple sensor devices within an environment. The sensor devices can generate sensor data and exchange a variety of types of data to ultimately result in a distributed, consistent model result being generated that remains accurate despite inter-sensor device communication faults that may occur resulting in missing data being exchanged between ones of the sensor devices.

Traditionally, complex machine learning models have been centrally (e.g., within a cloud, within a set of computing devices) trained and utilized, especially when dealing with models involving data from sensor devices that tend to have limited processing capabilities. For example, a central repository may aggregate a potentially large number of data streams (from one or many sources) and run one large machine learning model, e.g., to determine a consistent representation of the state of a space.

As one example, creating a model of actions and objects in a three-dimensional (3D) space—or more generally, a representation of a system merging sensor data across a network of sensors—has traditionally used a network of sensors (e.g., cameras) sharing information through a central model that has learned a mapping to a latent representation of that environment. This is typically done using a central hub or cloud environment having immense processing power to be able to centralize the data and analyze it, due to the large cost of running the deep models commonly used to effectively model this data.

In contrast, a recent trend referred to as "fog computing" instead attempts to shift operations away from a centralized location and to closer to users or data. For example, common fog computing architectures use collaborative end-user clients and/or near-user edge devices to carry out a substantial amount of storage (rather than stored primarily in cloud data centers), communication (rather than routed over the internet backbone), control, configuration, measurement and management, etc. However, implementing systems using such an architecture is difficult for a variety of reasons, such as difficulties arising from the need to ensure consistency when distributed processing is involved, which is compounded due to increased issues with inter-device communication problems, issues with a lack of processing, memory, or networking capabilities, etc., present in many fog computing architectures.

According to some embodiments, a distributed consistent architecture is provided that can execute a machine learning model using multiple streams of sensor data that is significantly more robust to individual failures of components in the network than under other approaches. Moreover, in some embodiments, the results of the distributed use of the machine learning model are extremely accurate, little or no bandwidth to external networks may be required, and results can be generated faster than traditional centralized systems due to reduced communication latencies, etc.

For example, FIG. 1 is a block diagram illustrating an environment 100 including devices 102 utilizing consistent distributed edge models resulting from controlled dropout model training according to some embodiments. As shown, machine learning model 110 processing can be performed by multiple model engines 106 that may be on a same device (or a "nearby" device) as a sensor 104 that generates data for the model instead of sending sensor data to some potentially remote centralized repository for processing and then awaiting results to be returned. Instead, each model engine 106A can communicate with other "nearby" model engines 106B-106C within the same environment 100 (e.g., on a same local area network (LAN), within direct communicative range using device-to-device communication, etc.), where the model engines 106A-106N can each obtain sensor data (e.g., a data stream) from a nearby (or potentially on-device) sensor 104A-104N, possibly preprocess the sensor data to identify relevant features from the sensor data (e.g., as intermediate representations such as feature maps), and share the relevant features or sensor data with the other model engines 106A-106N. For example, the model engines 106A-106N can use a peer-to-peer communications protocol to exchange data. In this manner, each model engine 106A-106N can quickly have access to features from multiple sensor data streams—if not the actual sensor data streams themselves—and operate upon these sensor data streams using a common model 110 to each individually obtain results.

However, in some environments 100, the model engines 106A-106N may suffer from communications issues in that certain data exchanged between the model engines 106A-106N may not be properly received by the intended recipient. Such problems are well known to those of skill in the art, especially when peer-to-peer (P2P) communications protocols are involved that may not guarantee (or be able to provide) delivery of messages to all intended recipients in a timely manner. In such cases, if a particular model engine 106A is unable to receive (or timely receive) sensor data representations from one or more other model engines, that model engine 106A may be unable to generate accurate results from the model 110, as its model expects a full set of input data stream information. Thus, ones of the model engines 106A-106N may be unable to generate accurate results, and may generate differing (or inconsistent) views of the environment.

Accordingly, in some embodiments, a model 110 is trained across a set of sensor streams to analyze an environment (e.g., a 3D space) as described above; however, during the training phase, subsets of one or more of the sensor data streams can be dropped (or otherwise "ignored") to create a model that is tolerant of missing input data, thus providing a robustness in the representation to failures of data collecting components.

By deploying such a model 110 in this configuration, the model engines 106A-106N can be able to better handle missing sensor data from others of the model engines and thus generate higher quality results.

Moreover, in some embodiments, the results of the model 110 generated by a model engine 106A—e.g., a local hypothesis value 116 indicating a state of the environment 100—can be used together with results from other model engines 106A-106N and intelligently "combined" using an ensemble technique to yield a "final" result using the collective wisdom of the group of model engines 106A-106N, which allows each model engine 106A-106N/device 102A to maintain a consistent, highly-accurate model result. Accordingly, such a system provides "built in" failure tolerance in that, as P2P-type communications often fail, potentially many model engines may only receive a subset of the data from the other model engines that they may need to generate a "final" inference. Thus, these model engines can use the subset of the data that they do receive to come up with a result that may not be conditioned on all the data that is ideally available, and this result can be improved though the inter-engine sharing of individual results, which can be ensembled by each model engine to produce a better overall solution.

For example, in some embodiments a machine learning model 110 is trained as described herein, including dropping ones of the sensor data streams during the training to simulate failures and thus develop a robust, fault-tolerant model. This model 110 can be deployed, at circle '1', to multiple model engines 106A-106N within an environment 100 such as a building, room, floor, vehicle, or other region. In some embodiments, the model engines 106A-106N are software components executed by one or more processors of an electronic device 102A-102N, and code for the model engines 106A-106N and the models 110 can be stored in a memory or storage of the devices 102A-102N.

In some embodiments, each model engine 106A-106N is implemented within a same device 102A-102N as a sensor 104A-104N, though in other embodiments a model engine 106A-106N may be implemented by a separate device, and each such model engine 106A-106N may serve (or operate upon sensor data from) one sensor 104A or potentially multiple sensors.

In some embodiments, each sensor 104A-104N comprises a sensor stack including one or more sensing components able to sense physical environmental characteristics such as light, sound, electrical signals, particles, etc., and generate digital sensor data indicative of those sensed characteristics. As one example, a sensor 104A may comprise an optical sensor stack for a camera, which may include a lens, a sensor unit, and an image signal processor (ISP), etc. Of course, many other types of sensors exist that can be utilized that are known to those of skill in the art, and which employ different types of sensor components, such as microphones, particle sensors, temperature sensors, proximity sensors, etc.

Thus, the sensors 104A-104N, at circle '2', may sense environmental characteristics and generate sensor data—e.g., images, audio data, numeric readings, etc.

In some embodiments, at circle '3', the sensor data can be input to the model 110, and portions of one or more transform layers 112 of the model 110 can transform the sensor data from one or multiple sensors of the sensor device into a form (e.g., an "intermediate" representation of the sensor data, such as a feature map) that is conducive for use by the model 110. For example, the transform layers 112 may perform a type of feature extraction from the sensor data. However, in some embodiments the transform layer(s) 112 may not alter the sensor data, e.g., via passing-through the sensor data, multiplying it by one, etc. In some embodiments, the transform layers 112 may include multiple parts, where each part can be used for sensor data from a particular sensor device, and thus a model engine 106A may provide the sensor data as an input to this portion of the model 110. In some embodiments, only those parts of the transform layers 112 that are relevant for a particular sensor device are deployed to that sensor device. In some embodiments, the transform layers 112 may be one or more convolutional layers of a convolutional neural network (CNN) model 110, for example.

At circle '4', the generated representations of sensor data 108 are sent to the others of the group of model engines 106B-106N; similarly, the others of the group of model engines 106B-106N also acquire sensor data from their corresponding sensor(s), use the transform layers 112 of the model 110 to generate representations of the sensor data, and attempt to send their representations 108 at circle '4' to each other model engine.

Alternatively, in some embodiments, such transform layers 112 may not be utilized, or the transform layers 112 may not modify the sensor data. This configuration may be beneficial when a sensor 104A provides sensor data that is more directly-usable by a model 110, such as numeric values (e.g., temperature or humidity readings), which are more readily operated upon when compared to other types of sensor data, such as image data. Thus, at circle '4' the sensor data representations 108 may comprise this "raw" sensor data (or minimally processed sensor data) and be exchanged instead of other more transformed representations (e.g., feature maps).

Once each of the model engines 106A-106N have generated sensor data representations and attempted to provide them to each of the other model engines, each model engine may then, at circle '6' input the locally-generated representations and those received remotely-generated representations into a second part of the model 110 referred to as back layers 114. In some embodiments, the back layers 114 includes a squeeze layer 115 and prediction layers 117 to perform inference, which could be as one example one or more fully-connected layers of a CNN model 110. The back layers 114 may have been trained, during the training phase, using "dropped" sets of input data and thus, any sensor data representations that are not received from other model engines may be handled by the model more robustly than using traditional techniques.

As a result, the back layers 114 can output a hypothesis value that represents a state of the environment 100. For example, the hypothesis value may be of a variety of formats and types known to those of skill in the art, such as a single value, a set of values, etc. The hypothesis value, as one example, could indicate the existence and/or identities of certain objects or events within the environment 100, the locations of these objects or events, etc.

As described herein, it is possible that the communication of the sensor data representations may have encountered certain faults, e.g., some or all sensor data representations may not be received by certain ones (or all) of the model engines 106A-106N. For example, optional circle '5' illustrates a sensor data representation sent from model engine 106B that did not arrive (or did not arrive on time) at model engine 106N. Thus, it is possible that some or all of the model engines 106A-106N may generate different representations of the state of the environment due to discrepancies between what features maps were available to the engines.

To improve the overall quality of the understanding of the state of the environment, the model engines 106A-106N can utilize an ensemble method. Ensemble methods are techniques where create multiple models or data points can be combined to produce an improved result, which typically provides a more-accurate solution. For example, an ensemble method such as majority or weighted voting, simple or weighted averaging, etc., can be used to combine multiple hypothesis values into a single ensembled hypothesis value.

At circle '7', the model engines 106A-106N may now share their locally-generated hypothesis values 116 with each other, and each model engine 106A-106N can apply an ensemble technique using its locally-generated hypothesis value and the received hypothesis values to result in a single ensembled hypothesis 118 data structure at circle '8' representing a consensus-based representation of the environment 100. Notably, this ensembled hypothesis 118 is highly-likely to be highly-accurate, even when one or more of the involved hypotheses are of low accuracy.

With the ensembled hypothesis 118, one or more (or all) of the model engines 106A-106N (or other components implemented in or executed by the devices 102A-102N) may analyze the ensembled hypothesis 118 to detect certain conditions. If a particular condition or conditions are found (e.g., an object existing within a particular area, an object moving too fast, a temperature of an object being too hot or cold, a noise coming from a particular location), the model engines 106A-106N (or devices 102A-102N) may perform one or more responsive actions, e.g., sending a notification message 120 (e.g., a warning or alert, a command to perform an action such as a "shutdown" or "slowdown") to a device 122A within the environment 100 or a device 122B outside the environment 100. Of course, in various embodiments, many different types of responsive actions may be performed upon detecting particular conditions in various environments, such as causing audio and/or visual outputs to be generated (e.g., via a display device or speaker device), updating a different data structure or plan (e.g., generating a new navigation route through the environment for a device/vehicle), etc.

Additionally or alternatively, a model engine 106A may be associated with a particular area of the environment, type of object or event within the environment, etc., and thus the model engine 106A may watch for conditions involving such an associated area/object/event, and only perform responsive actions for these conditions. Thus, a distribution of responsibilities can be affected by assigning different responsibilities to different model engines 106A-106N. Further, in some embodiments, the different model engines 106A-106N can be adapted to, as a responsive action, send a "voting" message to a device serving as a central management unit (or one of the model engines serving as a central management unit), which can determine whether a sufficient (or threshold) number of "votes" involving a location/object/event were received, and if so, perform a different responsive action—e.g., shutting down or turning on a device, sending an alert, etc.

Figure 2:
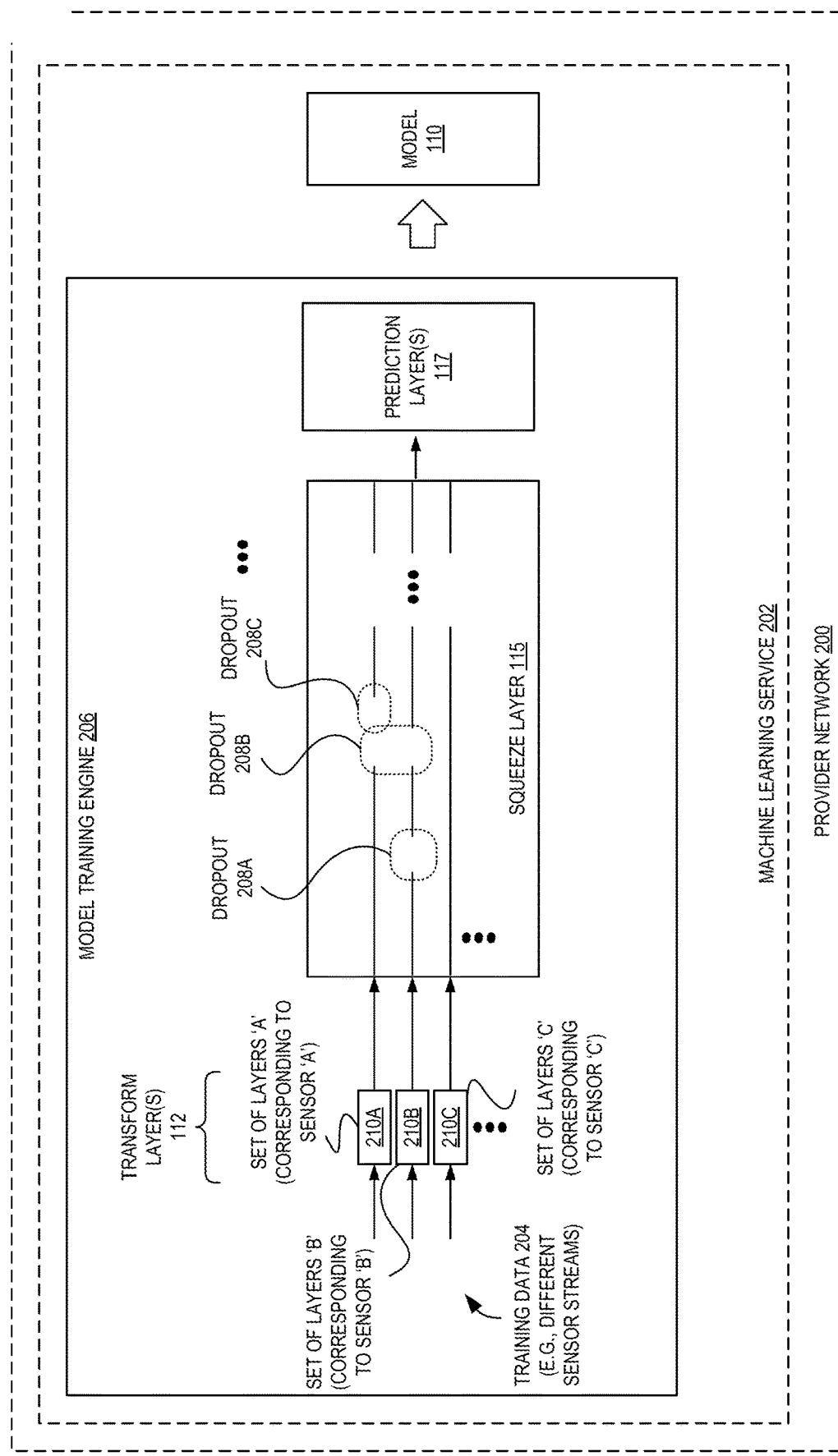
FIG. 2 is a block diagram illustrating controlled dropout model training according to some embodiments.

To further explore the generation of these fault-tolerant models 110, we turn to FIG. 2, which is a block diagram illustrating controlled dropout model training according to some embodiments.

In some embodiments, model training may be performed by a machine learning service 202 offered within a provider network 200 A provider network 200 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage), network-related resources (e.g., configuring virtual networks including groups of compute resources, content delivery networks (CDNs), Domain Name Service (DNS)), application resources (e.g., databases, application build/deployment services), etc. These and other computing resources may be provided as services, such as a hardware virtualization service that can execute compute instances, a storage virtualization service that can store data objects, etc. The users (or "customers") of provider networks 200 may utilize one or more user accounts that are associated with a customer account, though these terms may be used somewhat interchangeably depend ending upon the context of use. Users may interact with a provider network 200 across one or more intermediate networks (e.g., the internal via one or more interface(s), such as through use of application programming interface (API) calls, via a console implemented as a website or application, etc. The interface(s) may be part of, or serve as a front-end to, a control plane of the provider network 200 that includes "backend" services supporting and enabling the services that may be more directly offered to customers.

To provide these and other computing resource services, provider networks 200 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the service provider system to perform a variety of computing tasks, or may indirectly utilize a compute instance by submitting code to be executed by the service provider system, which in turn utilizes a compute instance to execute the code (typically without the user having any control of or knowledge of the underlying compute instance(s) involved).

Thus, a machine learning service 202 may train models (e.g., on behalf of users) using a model training engine 206, which may be implemented using one electronic device or a group or "cluster" of electronic devices. For example, the model training engine 206 may execute as one or more containers within one or more VMs, and the training may be performed in parallel using multiple containers, VMs, and/or electronic host devices.

In this example, training data 204 can be obtained and provided to the model training engine 206. For example, different streams of sensor data (e.g., image data, audio data, temperature data, etc.) from the sensors 104A-104N deployed in the environment 100 may be provided to the provider network 200, which may be provided directly to the model training engine 206, or stored/persisted and then later provided to the model training engine 206, etc. The model training engine 206 can train a model 110 using techniques known to those of skill in the art, e.g., using particular machine learning algorithms, parameters, etc. For example, training data 204 can be run through a set of layers corresponding to a particular sensor (that provided or is otherwise associated with the training data 204), which can be used to train a squeeze layer 115, predication layer(s) 117, etc., to ultimately yield a model 110. In some embodiments, other layers may also be utilized based on the particular type of models being trained, the amount and/or types of sensors involved, etc.

In some embodiments, the model training engine 206 will "drop" a subset or subsets of the data corresponding to the training data 204 streams for the training. As shown in FIG. 2, a first dropout 208A of a second data stream involves data corresponding to a period of time while the first and third data streams continue to be utilized for training. A second dropout 208B is shown thereafter that drops data of two streams—the first and second—and thereafter a third dropout 208C of the first stream occurs, etc. Thus, as described herein, the model 110 becomes, over time, able to accommodate missing training data and still produce accurate results, e.g., by relying on the other streams, historic information still represented in the model (e.g., as part of a model that is auto-regressive such as a recurrent neural network (RNN)), etc.

The model training engine 206 can "drop" a training data stream in a variety of ways. In some embodiments, the model training engine 206 can modify hyperparameters such as by decreasing or zeroing certain weights used during training, modifying or removing activations, changing or removing other information related to that stream during training, etc. As a result, the gradient of the model updates accordingly and updates the rest of weights in the model. After substantial amounts of training and drop-outs, the model has weights tuned to be able to deal with missing stream data.

In some embodiments, one or more of the streams have associated distributions indicating how often the streams are to be dropped. Thus, as an example, a distribution may be utilized that indicates that a stream is to be dropped a particular percentage of the time, and this distribution can be used to determine when a stream—or streams—are to be dropped. In some embodiments, each stream has its own distribution, and in some embodiments each stream has a same distribution. The selection of the particular distribution can be made based on characteristics of the particular environment 100 and desires of the implementing entity, as different failure characteristics may exist that can be handled differently. For example, in a case where there are many communication issues between model engines 106A-106N, a selected distribution of dropouts may be significantly higher (e.g., to cause more dropouts) than an environment having few communication issues to cause the resultant model to be more or less acclimated to failure scenarios.

Figure 3:
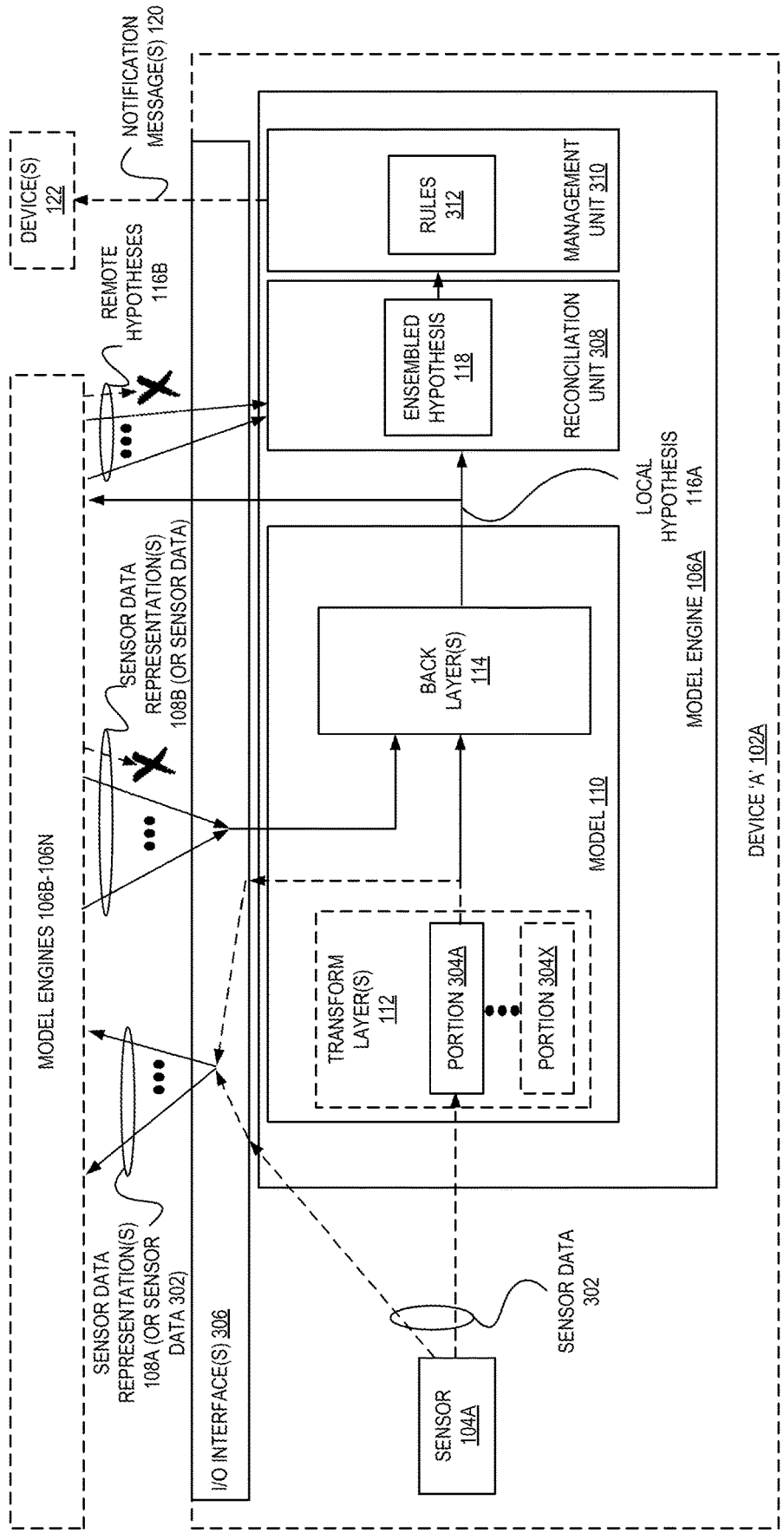
FIG. 3 is a block diagram illustrating components of a sensor device utilizing consistent distributed edge models according to some embodiments.
Figure 4:
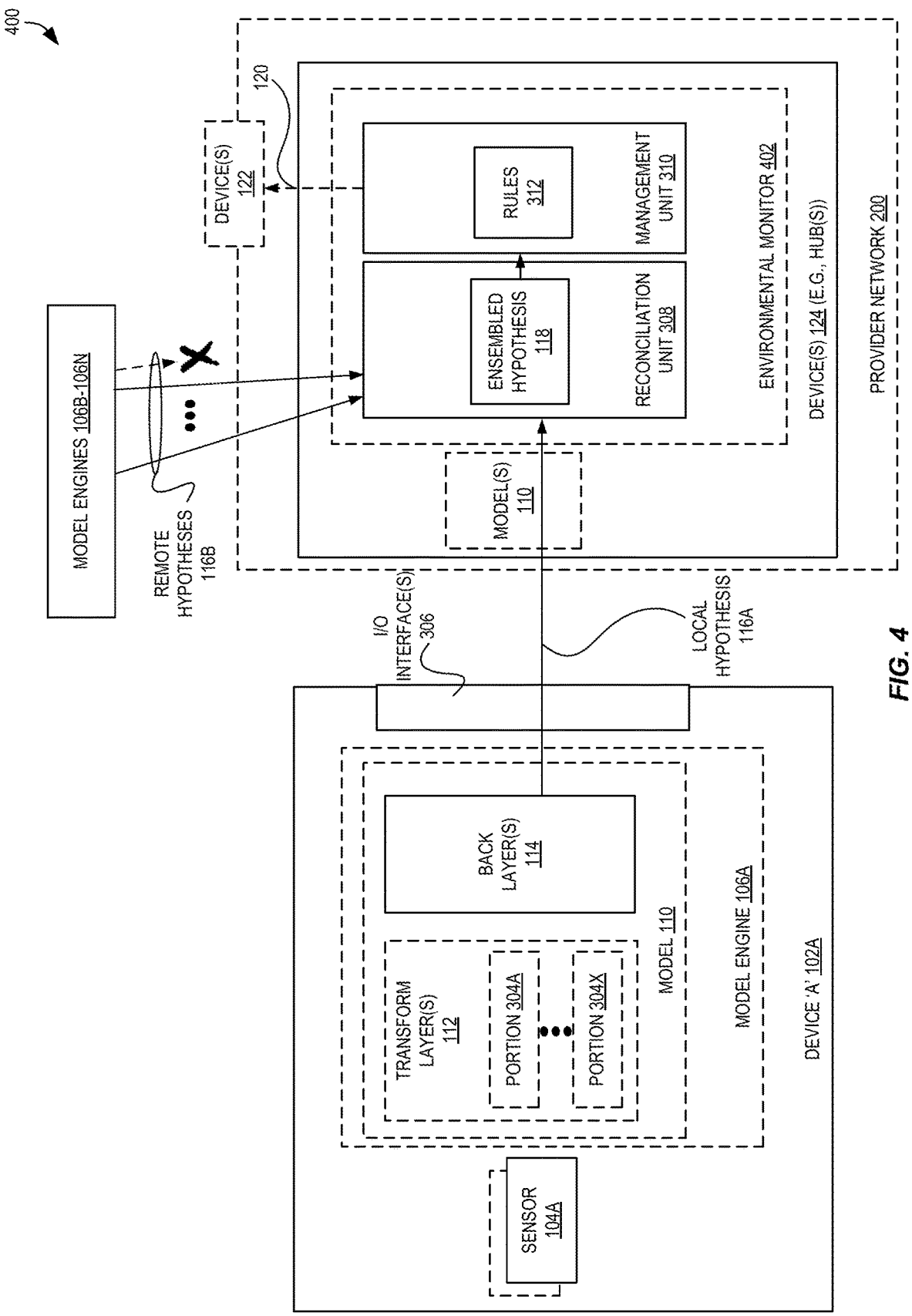
FIG. 4 is a block diagram illustrating split hypothesis reconciliation and management for sensor devices utilizing consistent distributed edge models according to some embodiments.

As indicated above, embodiments can be flexibly implemented in a variety of ways. Two such configurations are shown in FIG. 3 and FIG. 4. FIG. 3 is a block diagram illustrating components of a sensor device 102A utilizing consistent distributed edge models according to some embodiments. In this example, the sensor device 'A' 102A includes a sensor 104A and a model engine 106A, which includes the model 110 as well as a reconciliation unit 308 and management unit 310. In some embodiments, the reconciliation unit 308 and management unit 310 are software modules executed by one or more processors of the device 102A (e.g., via code/instructions stored in a non-illustrated memory/storage).

As shown, a sensor 104A may generate sensor data 302 that may be provided directly to other model engines 106B-106N (via an input/output (I/O) interface such as a network interface) and the back layers 114. Alternatively, the sensor data 302 may be provided to one or more portions 304A-304X of one or more transform layers 112 of the model 110 to generate a representation 108 of the sensor data. As indicated herein, the one or more transform layers 112 may include multiple portions 304A-304X that are relevant to particular ones of the sensors 104A and thus the sensor data 302 may be provided to those relevant portions 304A. The one or more representations 108 may be provided to the other model engines 106B-106N as well as to the one or more back layers 114, which may also utilize, as input, other representations 108 (or sensor data) sent by the other model engines 106B-106N.

The one or more back layers 114 generate a local hypothesis 116A data structure, which is provided to the other model engines 106B-106N as well as to the reconciliation unit 308, which also utilizes as inputs received "remotely" generated hypothesis values from the other model engines 106B-106N. The reconciliation unit 308 applies an ensemble technique to generate a single ensembled hypothesis 118 data structure, which is evaluated/analyzed by a management unit 310 to detect the potential existence of one or more conditions as indicated by one or more rules 312. The rules 312 may be configured by the implementing user, and may indicate conditions to search for, and one or more responsive actions to be performed when the corresponding condition(s) are satisfied. For example, an action may be to send a notification message 120 to another device 122.

Another potential deployment is shown in FIG. 4, which is a block diagram illustrating split hypothesis reconciliation and management for sensor devices utilizing consistent distributed edge models according to some embodiments. In this illustration, various components and operations are not shown for the sake of clarity. In this example, the reconciliation unit 308 and management unit 310 are implemented by an environmental monitor 402 that is provided by a different device 124. Thus, upon the model engines 106A-106N generating hypothesis values, these hypothesis values can be sent to the environmental monitor for final reconciliation (e.g., application of an ensemble technique by the reconciliation unit 308) and environment management (by management unit 310). This device 124 can be deployed within a same or different environment as the model engines 106A-106N, and can be used to offload the burden of monitoring and analyzing the current state of the environment and/or performing responsive actions.

As another example, in some embodiments some or all of the model 110 may not be deployed on the device 102A and instead, the device 102A may send "raw" sensor data (e.g., direct from a sensor component) or intermediate sensor data representations (e.g., feature maps, such as from transform layers 112) to another device 124 (e.g., a hub device within a same network as the device 102A, a host device within a provider network 200, etc.). This device 124 may include some or all of the model 110, and can generate local hypothesis (on behalf of the device 102A, and possibly on behalf of other devices), possibly exchange hypothesis values (e.g., to obtain remote hypotheses), and/or create an ensemble hypothesis 118 as described herein.

Figure 5:
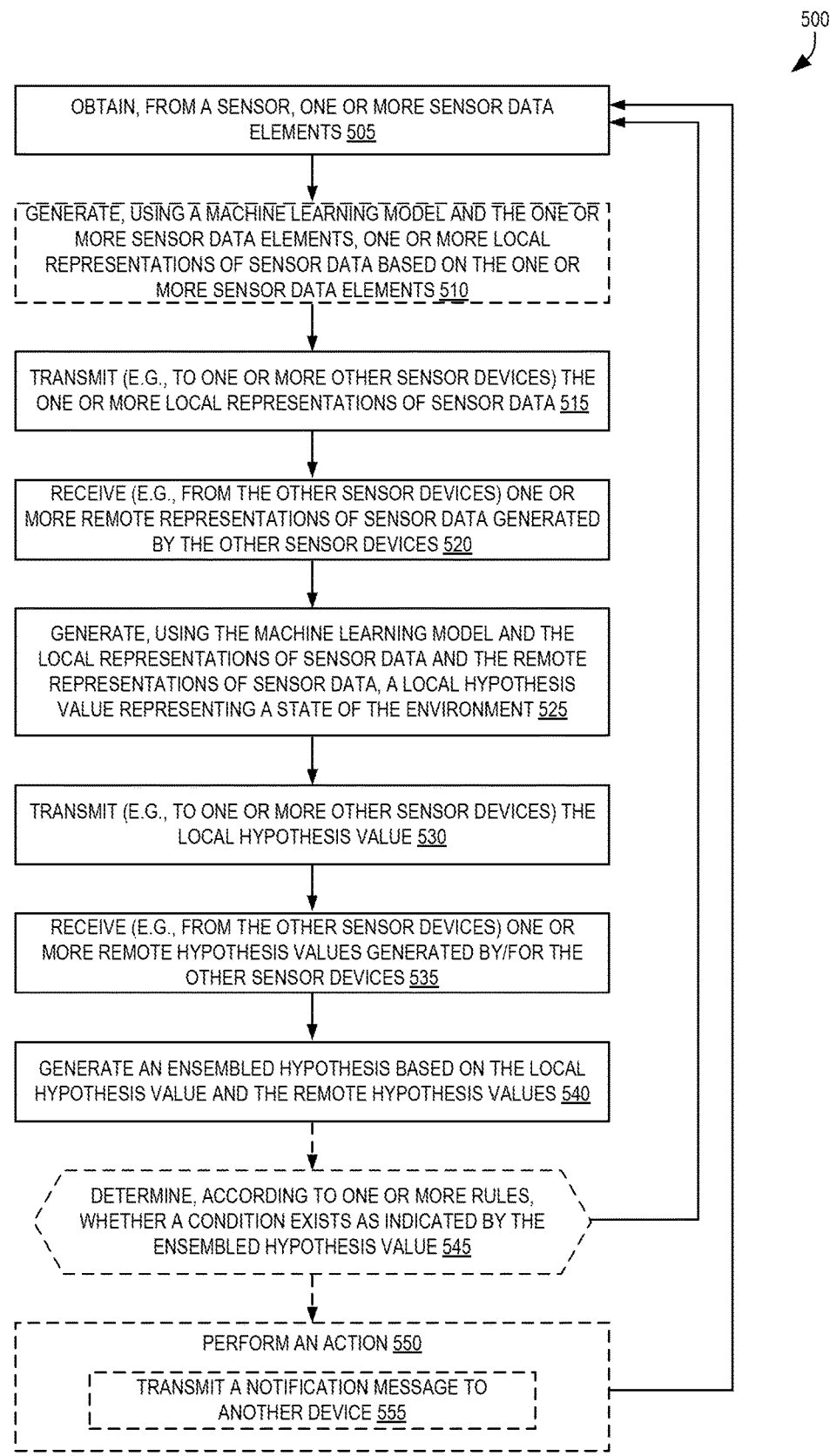
FIG. 5 is a flow diagram illustrating operations for utilizing consistent distributed edge models resulting from controlled dropout model training according to some embodiments.

FIG. 5 is a flow diagram illustrating operations 500 for utilizing consistent distributed edge models resulting from controlled dropout model training according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by a model engine of the other figures.

The operations 500 include, at block 505, obtaining, from a sensor, one or more sensor data elements. The sensor may include one or more components that can sense or measure physical environmental characteristics and represent these characteristics as digital data. For example, the sensor could be a camera sensor stack and the one or more sensor data elements could be one or more images (e.g., a 224×224×3 Red Green Blue (RGB) image) captured by the camera sensor stack. As another example, the sensor could be a microphone and the one or more sensor data elements could be one or more digital audio clips.

At block 510, the operations 500 include generating, using a machine learning model and the one or more sensor data elements, one or more "local" sensor data representations based on the one or more sensor data elements. In some embodiments, the machine learning model comprises a convolutional neural network (CNN) and block 510 may include using the one or more sensor data elements to a part of one or more convolutional layers of the machine learning model to generate one or more sensor data representations.

The operations 500 include, at block 515, transmitting, to one or more other sensor devices, the one or more local sensor data representations. The transmission may occur using a P2P protocol, and may be performed via a local area network (LAN), direct connections, etc.

The operations 500 include, at block 520, receiving, from the other sensor devices, one or more "remote" sensor data representations generated by the other sensor devices. Sensor data representations may or may not be received from all of a plurality of other sensor devices in the environment. Each sensor data representation may be generated by one of the other sensor devices based on inputting sensor data elements from another sensor into the model.

The operations 500 include, at block 525, generating, using the machine learning model and the local sensor data representations and the remote sensor data representations, a local hypothesis value representing a state of the environment. In some embodiments, block 525 includes inputting the local sensor data representations and the remote sensor data representations as inputs to a second part of the machine learning model. In some embodiments, the machine learning model comprises a CNN and the second part of the machine learning model includes multiple fully-connected layers. The local hypothesis, in some embodiments, is a data structure indicating objects/events detected within the environment and/or locations of objects/events.

The operations 500 include, at block 530, transmitting, to one or more other sensor devices, the local hypothesis value. The operations 500 include, at block 535, receiving, from the other sensor devices, one or more remote hypothesis values generated by the other sensor devices.

The operations 500 include, at block 540, generating an ensembled hypothesis based on the local hypothesis values and the remote hypothesis values. In some embodiments, block 540 includes applying one or more ensemble techniques with the local hypothesis value and the remote hypotheses value to yield the ensembled hypothesis.

The operations 500 optionally include, at block 545, determining, according to one or more rules, whether a condition exists as indicated by the ensembled hypothesis value. The rules can be configured by a user, and may indicate one or more responsive actions to be performed when a corresponding condition (or conditions) are satisfied. For example, a condition may test for the existence of a particular type of object/event within the environment, and/or a particular object/event existing within a particular location within the environment, and/or a particular object moving at or above or below a particular speed or temperature, etc.

The operations 500 include, at block 550, performing a responsive action. In some embodiments, block 550 includes block 555 and transmitting a notification message to another device. The notification message may cause the recipient another device to perform an action, such as shutting down that or another device, generating an alert or alarm, etc.

In some embodiments, some of the operations 500 of FIG. 5 can be adapted to be performed with a device such as hub device (e.g., located in a same physical network or environment as the device 102A), or a virtualized device of a provider network. For example, in some embodiments, in block 505 the sensor data elements are received across a network from a sensor device; in blocks 515/530, the data (e.g., representations, hypothesis values) may be transmitted to another device (e.g., another hub device or virtualized device) or to another software processing module performing these operations for another sensor device; etc.

Figure 6:
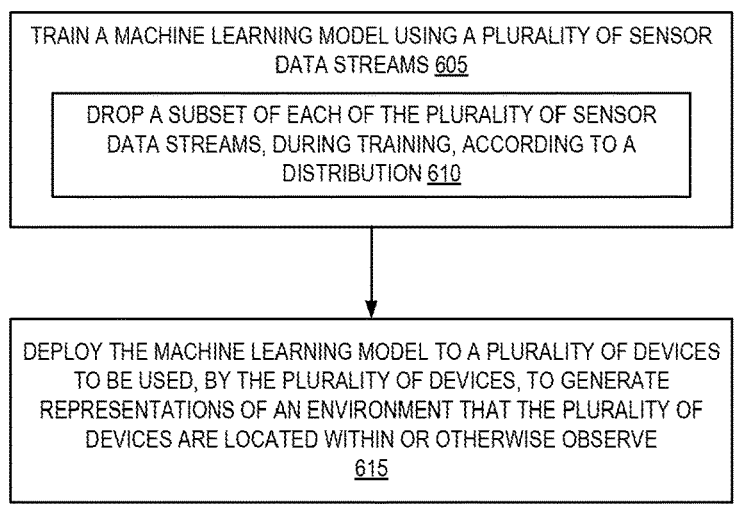
FIG. 6 is a flow diagram illustrating operations for controlled dropout model training according to some embodiments.

FIG. 6 is a flow diagram illustrating operations 600 for controlled dropout model training according to some embodiments. Some or all of the operations 600 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 600 are performed by the machine learning service 202 of FIG. 2.

The operations 600 include, at block 605, training a machine learning model using a plurality of sensor data streams. The machine learning model may be a deep model such as a multilayer neural network, e.g., a recurrent neural network (RNN), convolutional neural network (CNN), etc. Block 605 includes block 610, and dropping ones of the plurality of sensor data streams, during training, according to a distribution. In some embodiments, any number of sensor data streams may be dropped at a time (e.g., 0, 1, 2, etc., or all). A sensor data stream may be selected to be dropped according to a distribution assigned to that sensor data stream, or assigned for all sensor data streams. A particular sensor data stream or streams may be chosen to be dropped at random. In some embodiments, the distribution is based on anticipated communicative failure characteristics of the environment in which the sensors are deployed or to be deployed.

The operations 600 also include, at block 615, deploying the machine learning model to a plurality of devices to be used, by the plurality of devices, to generate representations of an environment that the plurality of devices are located within or otherwise observe. In some embodiments, the fault-tolerant representations comprise the ensembled hypothesis values of the other figures.

Figure 7:
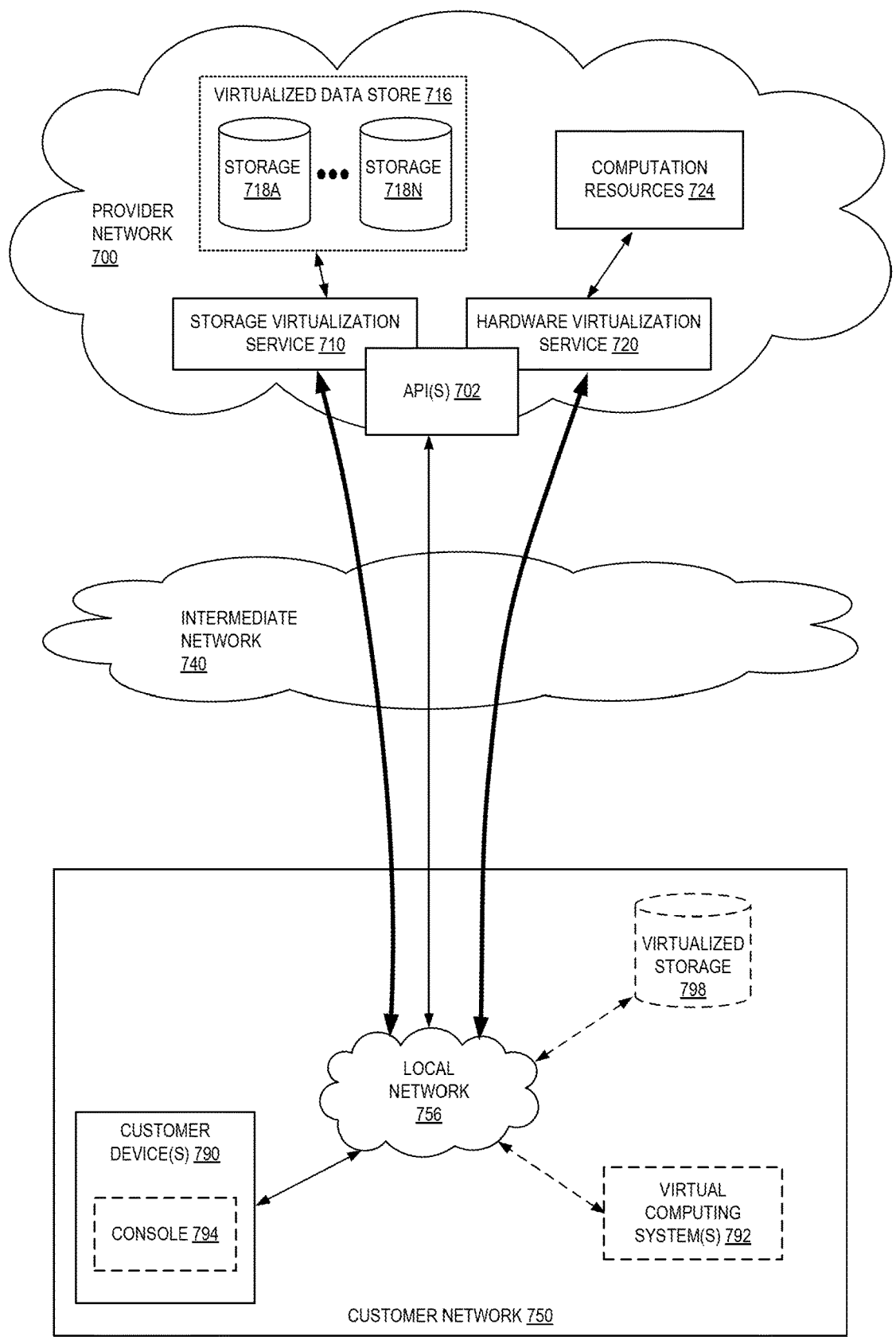
FIG. 7 is a block diagram of an example provider network that provides a storage virtualization service and a hardware virtualization service to customers according to some embodiments.

As described herein, in some embodiments a provider network may be utilized such as by training and/or hosting a model and/or applications that utilize the results generated by the machine learning models described herein. FIG. 7 is a block diagram of an example provider network that provides a storage virtualization service and a hardware virtualization service to customers, according to some embodiments. Hardware virtualization service 720 provides multiple computation resources 724 (e.g., VMs) to customers. The computation resources 724 may, for example, be rented or leased to customers of the provider network 700 (e.g., to a customer that implements customer network 750).

Each computation resource 724 may be provided with one or more local Internet Protocol (IP) addresses. Provider network 700 may be configured to route packets from the local IP addresses of the computation resources 724 to public Internet destinations, and from public Internet sources to the local IP addresses of computation resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage virtualization service 710, for example via one or more APIs 702, to access data from and store data to storage resources 718A-718N of a virtual data store 716 provided by the provider network 700. In some embodiments, a virtualized data store gateway (not shown) may be provided at the customer network 750 that may locally cache at least some data, for example frequently accessed or critical data, and that may communicate with virtualized data store service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes, which appear to the user as local virtualized storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Figure 8:
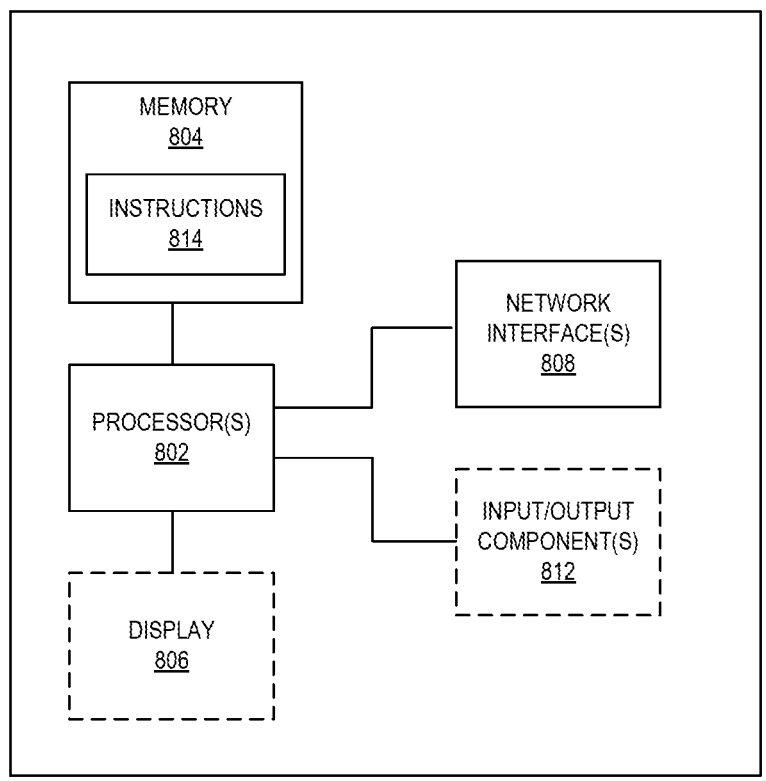
FIG. 8 illustrates a logical arrangement of a set of general components of an exemplary computing device that can be utilized in accordance with various embodiments.

FIG. 8 illustrates a logical arrangement of a set of general components of an example computing device 800 such as an electronic device including a sensor stack, implementing a normalization model adapter 206, etc. Generally, a computing device 800 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 802 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 804) to store code (e.g., instructions 814) and/or data, and a set of one or more wired or wireless network interfaces 808 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 804) of a given electronic device typically stores code (e.g., instructions 814) for execution on the set of one or more processors 802 of that electronic device. One or more parts of various embodiments may be implemented using different combinations of software, firmware, and/or hardware.

A computing device 800 can include some type of display element 806, such as a touch screen or liquid crystal display (LCD), although many devices such as portable media players might convey information via other means, such as through audio speakers, and other types of devices such as server end stations may not have a display element 806 at all. As discussed, some computing devices used in some embodiments include at least one input and/or output component(s) 812 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and utilize a microphone, camera, sensor, etc., such that a user can control the device without having to be in physical contact with the device.

Figure 9:
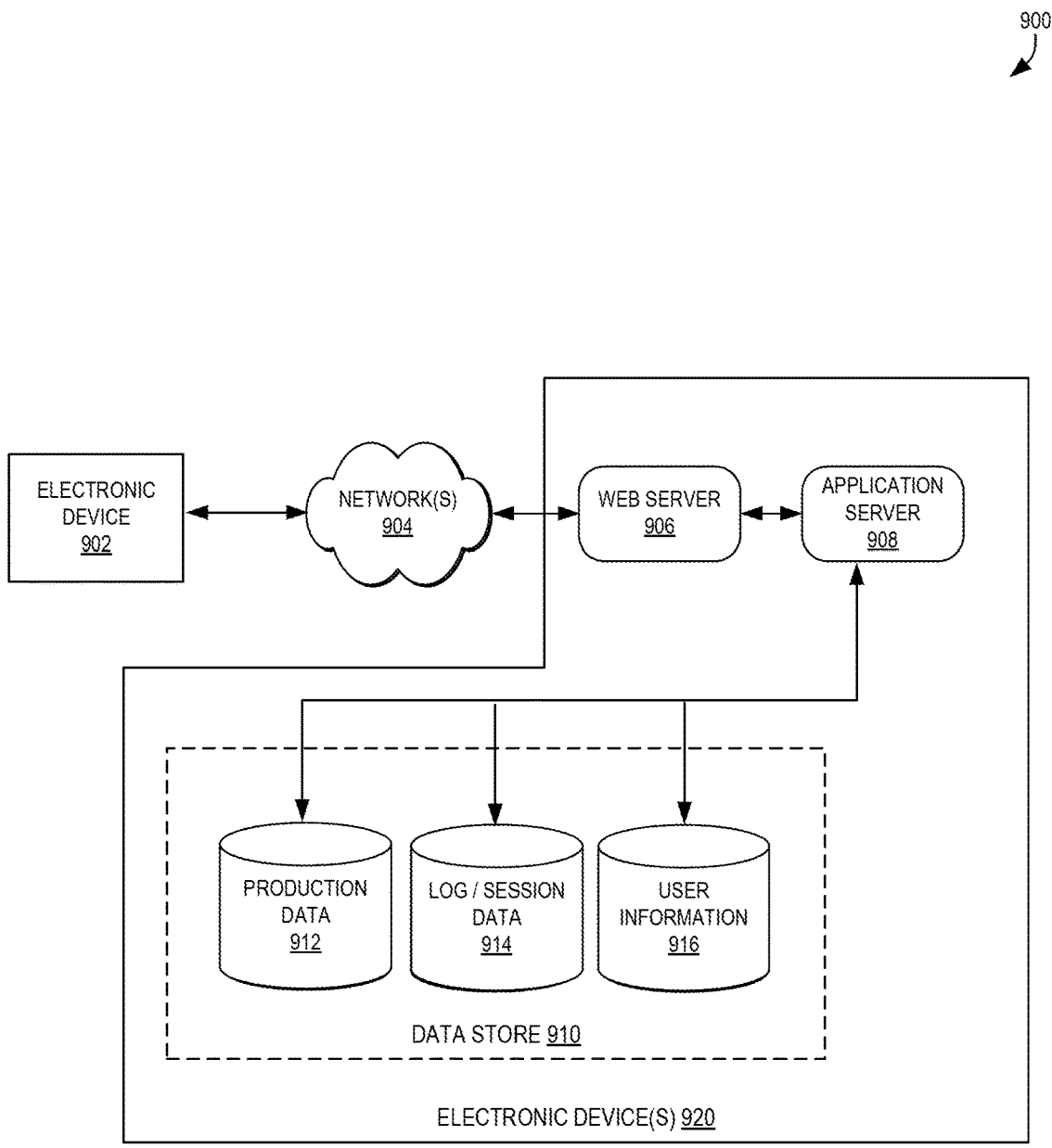
FIG. 9 illustrates an example of an environment for implementing aspects in accordance with various embodiments.

As discussed, different approaches can be implemented in various environments in accordance with the described embodiments. FIG. 9 illustrates an example of an environment 900 for implementing aspects in accordance with various embodiments. For example, some embodiments utilize HyperText Transfer Protocol (HTTP) request messages that are received by a web server (e.g., web server 906), and the users, via electronic devices, may interact with the provider network via a web portal provided via the web server 906 and application server 908. As will be appreciated, although a web-based environment is used for purposes of explanation, different environments may be used, as appropriate, to implement various embodiments. The system includes an electronic client device 902, which may also be referred to as a client device and can be any appropriate device operable to send and receive requests, messages or information over an appropriate network 904 and convey information back to a user of the device 902. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 904 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 904 includes the Internet, as the environment includes a web server 906 for receiving requests and serving content in response thereto, although for other networks an alternative device serving a similar purpose could be used, as would be apparent to one of ordinary skill in the art.

The illustrative environment includes at least one application server 908 and a data store 910. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 908 can include any appropriate hardware and software for integrating with the data store 910 as needed to execute aspects of one or more applications for the client device 902 and handling a majority of the data access and business logic for an application. The application server 908 provides access control services in cooperation with the data store 910 and is able to generate content such as text, graphics, audio, video, etc., to be transferred to the client device 902, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 902 and the application server 908, can be handled by the web server 906. It should be understood that the web server 906 and application server 908 are not required and are merely example components, as structured code discussed herein can be executed on any appropriate device or host machine as discussed elsewhere herein.

The data store 910 can include several separate data tables, databases, or other data storage mechanisms and media for storing data relating to a particular aspect. For example, the data store illustrated includes mechanisms for storing production data 912 and user information 916, which can be used to serve content for the production side. The data store 910 also is shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update, or otherwise process data in response thereto. In one example, a user might submit a search request for a certain type of item. In this case, the data store 910 might access the user information 916 to verify the identity of the user and can access a production data 912 to obtain information about items of that type. The information can then be returned to the user, such as in a listing of results on a web page that the user is able to view via a browser on the user device 902. Information for a particular item of interest can be viewed in a dedicated page or window of the browser.

The web server 906, application server 908, and/or data store 910 may be implemented by one or more electronic devices 920, which can also be referred to as electronic server devices or server end stations, and may or may not be located in different geographic locations. Each of the one or more electronic devices 920 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the environment 900 in FIG. 9 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 102A-102C) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A system comprising:
a first camera device and a plurality of other camera devices operating in an environment, wherein the first camera device comprises a sensor component, one or more processors, and a non-transitory computer-readable storage medium storing a model and having instructions which, when executed by the one or more processors, cause the first camera device to:
generate, based on sensor data generated by the sensor component, a feature map through use of a first part of the model, the feature map representing the sensor data of the first camera device, wherein a second part of the model was trained using a plurality of training data streams in which a subset of each of the plurality of training data streams was excluded to simulate a failure of one or more but not all of the plurality of other camera devices;
transmit, to each of the plurality of other camera devices, the feature map representing the sensor data of the first camera device;
receive, from one or more but not all of the plurality of other camera devices, one or more feature maps generated by the one or more other camera devices, each feature map representing sensor data of the corresponding camera device; and
generate, using the second part of the model and the feature map representing the sensor data of the first camera device and the one or more feature maps generated by the one or more other camera devices, a local hypothesis value that represents a state of the environment.

2. The system of claim 1, wherein the instructions, when executed by the one or more processors, further cause the first camera device to:
transmit, to each of the plurality of other camera devices, the local hypothesis value;
receive, from each of one or more of the plurality of other camera devices, one or more remote hypothesis values each representing a state of the environment as determined by the corresponding camera device; and
generate an ensemble hypothesis value based on the local hypothesis value and the one or more remote hypothesis values.

3. The system of claim 2, wherein the instructions, when executed by the one or more processors, further cause the first camera device to:
determine that a condition exists within the environment based on an analysis of the ensemble hypothesis value; and
transmit a notification message to another device.

4. A system comprising:
a first sensor device and a second one or more sensor devices operating in a common environment, wherein the first sensor device comprises a sensor component, one or more processors, and a non-transitory computer-readable storage medium storing a model and having instructions which, when executed by the one or more processors, cause the first sensor device to:
receive, from one or more but not all of the second one or more sensor devices, a first one or more messages, wherein each of the first one or more messages includes a first intermediate representation of sensor data generated by an originating sensor device; and
generate, using the model and the one or more first intermediate representations and a second intermediate representation of sensor data generated by the sensor component, a local hypothesis value representing a state of the common environment, wherein the model includes a first part and a second part, wherein the second part was trained using one or more training data streams in which a subset of each of the one or more training data streams was excluded to simulate a failure of one or more but not all of the second one or more sensor devices.

5. The system of claim 4, wherein the instructions, when executed by the one or more processors, further cause the first sensor device to:
receive, from one or more of the second one or more sensor devices, one or more remote hypothesis values each representing a state of the common environment; and generate, based on the local hypothesis value and the one or more remote hypothesis values, an ensemble hypothesis value representing a state of the common environment.

6. The system of claim 5, wherein the instructions, when executed by the one or more processors, further cause the first sensor device to:
determine that a condition exists within the common environment based on an analysis of the ensemble hypothesis value; and
perform an action responsive to the determination that the condition exists.

7. The system of claim 4, wherein the instructions, when executed by the one or more processors, further cause the first sensor device to:
generate, based on the sensor data generated by the sensor component and the first part of the model, the second intermediate representation of the sensor data.

8. The system of claim 4, wherein:
the first intermediate representation of each of the first one or more messages is the sensor data generated by the originating sensor device, and
the second intermediate representation comprises the sensor data generated by the sensor component.

9. The system of claim 4, wherein the model comprises a multilayer neural network.

10. The system of claim 9, wherein:
the multilayer neural network comprises a convolutional neural network (CNN) or a recurrent neural network (RNN).

11. The system of claim 4, wherein the first sensor device is a camera device and the sensor component comprises an image signal processor (ISP).

12. The system of claim 11, wherein the local hypothesis value representing the state of the common environment identifies one or more objects within the common environment and locations of the one or more objects within the common environment.

13. The system of claim 12, wherein the instructions, when executed by the one or more processors, further cause the first sensor device to:
generate an ensemble hypothesis value representing a state of the common environment based on the local hypothesis value and one or more remote hypothesis values; and
determine or modify a navigational path through the common environment based on the ensemble hypothesis value.

14. A computer-implemented method comprising:
receiving, by a first sensor device from one or more but not all of a second one or more sensor devices operating in a common environment, a first one or more messages, wherein each of the first one or more messages includes a first intermediate representation of sensor data generated by an originating sensor device, wherein the first sensor device comprises a sensor component; and
generating, using a machine learning model and the one or more first intermediate representations and a second intermediate representation of sensor data generated by the sensor component, a local hypothesis value representing a state of the common environment, wherein the machine learning model includes a first part and a second part, wherein the second part was trained using one or more training data streams in which a subset of each of the one or more training data streams were excluded to simulate a failure of one or more but not all of the second one or more sensor devices.

15. The computer-implemented method of claim 14, wherein the machine learning model comprises a multilayer neural network.

16. The computer-implemented method of claim 15, wherein the machine learning model comprises a convolutional neural network.

17. The computer-implemented method of claim 14, further comprising:
receiving, from one or more of the second one or more sensor devices, one or more remote hypothesis values each representing a state of the common environment; and
generating, based on the local hypothesis value and the one or more remote hypothesis values, an ensemble hypothesis value representing a state of the common environment.

18. The computer-implemented method of claim 14, wherein the machine learning model comprises a recurrent neural network.

19. The computer-implemented method of claim 17, further comprising:
determining that a condition exists within the common environment based on an analysis of the ensemble hypothesis value; and
performing an action responsive to the determination that the condition exists.

20. The computer-implemented method of claim 14, wherein:
the first intermediate representation of each of the first one or more messages is the sensor data generated by an originating sensor device, and
the second intermediate representation comprises the sensor data generated by the sensor component.

* * * * *